United States Patent [19]

Van Veldhuizen

[11] Patent Number: 5,822,378

[45] Date of Patent: Oct. 13, 1998

[54] RECEIVER, A DEMODULATOR, AND A DEMODULATION METHOD

[75] Inventor: Evert D. Van Veldhuizen, Eindhoven, Netherlands

[73] Assignee: U.S. Philips Corporation, New York, N.Y.

[21] Appl. No.: 850,032

[22] Filed: May 2, 1997

[30] Foreign Application Priority Data

May 28, 1996 [EP] European Pat. Off. .............. 96201468

[51] Int. Cl.$^6$ ..................................... H03D 3/00
[52] U.S. Cl. .................... 375/334; 329/300; 329/302; 329/303
[58] Field of Search .................... 375/334, 335, 375/336, 337; 329/300, 302, 303

[56] References Cited

U.S. PATENT DOCUMENTS

| | | | |
|---|---|---|---|
| 3,543,172 | 11/1970 | Seppeler | 329/303 |
| 5,053,717 | 10/1991 | Schulz et al. | 329/300 |

FOREIGN PATENT DOCUMENTS

| | | | |
|---|---|---|---|
| 4210265C2 | 9/1993 | Germany | H04L 27/14 |

*Primary Examiner*—Stephen Chin
*Assistant Examiner*—Frederick Yu

[57] ABSTRACT

Known is a receiver having a demodulator for intermediate frequency modulated frequency shift keyed signals. The known demodulator applies absolute period time measurements expressing the period of a divided IF-signal into clock pulses of a relatively high frequency reference clock to detect data from a received signal. Such a demodulator is sensitive to frequency drift of the reference clock and has a relatively large power consumption. A receiver is proposed having a demodulator that is arranged to transform the intermediate frequency modulated frequency shift keyed signal into a lower frequency modulated frequency shift keyed signal so that the relative frequency deviation representing the data becomes substantially larger. The demodulator is arranged to determine the demodulated data from the lower frequency modulated frequency shift keyed signal by determining a difference in width of at least two successively measured periods of the lower frequency modulated frequency shift keyed signal and by generating a first logic signal value if the difference has a first polarity and by generating a second logic signal value if the difference has a second polarity.

10 Claims, 4 Drawing Sheets

RECEIVER, A DEMODULATOR, AND A DEMODULATION METHOD

BACKGROUND OF THE INVENTION

The present invention relates to a receiver comprising a demodulator for modulating an intermediate frequency modulated frequency shift keyed signal into modulated data, the frequency shift keyed signal having a frequency deviation representing the data.

The present invention further relates to a demodulator and to a modulation method. Such a receiver can be a cellular or cordless telephony receiver, a pager receiver, or the like.

A receiver of this kind is known from the German patent application DEOS 42 10 265. In this application an FSK-demodulator is described in which an intermediate frequency modulated frequency shift keyed signal is fed to a comparator coupled to a Schmitt-trigger an output of which is coupled to a divider. The divided signal is fed to means for determining an absolute period of thereof. The absolute period is determined as a number of counter pulses of a counter clocked by clock signal generated by a reference oscillator. The clock frequency of this reference oscillator is substantially greater than the frequency of the intermediate frequency modulated frequency shift keyed signal. Because of the relatively high frequency of the clock signal, such a demodulator consumes a lot of power. Furthermore, the high frequency clock signal can generate interferences in the receiver. Also, the demodulator cannot cope with a relatively high frequency drift of the reference oscillator so that no inexpensive crystal oscillator can be used.

OBJECTS AND SUMMARY OF THE INVENTION

It is an object of the present invention to provide a receiver having a demodulator that is insensitive to relatively great frequency drifts of the frequency of the reference oscillator, that has low interference with other parts of the receiver, and that is low cost.

To this end the receiver according to the present invention is characterized in that the demodulator is arranged to transform the intermediate frequency modulated frequency shift keyed signal into a lower frequency modulated frequency shift keyed signal so that the relative frequency deviation representing the data becomes substantially larger, and in that the demodulator is arranged to determine the demodulated data from the lower frequency modulated frequency shift keyed signal by determining a difference in width of at least two successively measured periods of the lower frequency modulated frequency shift keyed signal and by generating a first logic signal value if the difference has a first polarity and by generating a second logic signal value if the difference has a second polarity. The present invention is based upon the insight that the transformation substantially increases the relative frequency deviation of the frequency shift keyed signal so that a much more reliable detection can be done, and further that a difference measurement to the transformed signal is done making the demodulator largely insensitive to drift effects.

In an embodiment of a receiver according to the present invention, the demodulator comprises threshold means for preventing the logic signal value to change if the difference in width is below a predetermined threshold. Herewith, the demodulator becomes more insensitive to digital noise.

In an embodiment of a receiver according to the present invention, the demodulator comprises an up-counter for measuring and representing a width of at least one period and a down-counter for measuring and representing a width of at least one subsequent period, and control means for loading the down-counter with an up-counter counting value and resetting the up-counter at a period boundary. Herewith, the difference can be easily determined.

In another embodiment of a receiver according to the present invention, the demodulator comprises an up-down-counter for measuring and representing the width of the at least one period and the at least one subsequent period, and further control means for changing a count mode of the up-down-counter from up-counting to down-counting at a period boundary, and vice versa. In this embodiment, the hardware is simpler. On the other hand, measurement results are only available at instants separated by at least two periods of the lower frequency modulated frequency shift keyed signal.

In an embodiment of the receiver according to the present invention, the demodulator comprises a divider for dividing the lower frequency modulated frequency shift keyed signal by an integer divisor greater than one and that the demodulated data is determined from the divided lower frequency modulated frequency shift keyed signal. A divider might become necessary if the period of the lower frequency signal would be too short to generate a significant difference signal. Alternatively, the measurement could be extended over more than one period.

In an embodiment of a receiver according to the present invention, the demodulator comprises a reference clock signal generator for generating a reference clock signal and a data flip-flop, the reference clock signal being coupled to a clock input of the data flip-flop, the intermediate frequency modulated frequency shift keyed signal being coupled to a data input of the data flip-flop, and the lower frequency modulated frequency shift keyed signal being available at an output of the data flip-flop. Herewith, a simple transformation means is achieved.

In an embodiment of a receiver according to the present invention, the demodulator comprises an edge detector for detecting edges in the lower frequency modulated frequency shift keyed signal at signal period boundaries, and for generating control pulses while detecting the edges, the control pulses controlling measurement of the periods of the lower frequency modulated frequency shift keyed signal. Herewith, the measurements can be controlled easily.

In further embodiments of a receiver according to the present invention, the demodulator can be embodied as a mixed hardware/software demodulator. The output signal of the clocked data flip-flop used for transformation can be fed to an I/O-port of a microcontroller suitably programmed to carry out the difference measurement. In this embodiment, the lower frequency modulated frequency shift keyed signal can generate interrupts to control the measurements carried out by the microcontroller. The time measurements can be done by a hardware counter clocked by a system clock of the microcontroller or can be done completely in software. An advantage of such an embodiment is that the number of periods over which a difference measurement is carried out can easily be adapted by the software. Also, the difference could be observed over a number of measurements so that a filtering function can be carried out.

BRIEF DESCRIPTION OF THE DRAWINGS

The present invention will now be described, by way of example, with reference to the accompanying drawings, wherein.

Throughout the figures the same reference numerals are used for the same features.

DETAILED DESCRIPTION OF THE PREFERRED EMBODIMENT

Figure 1:
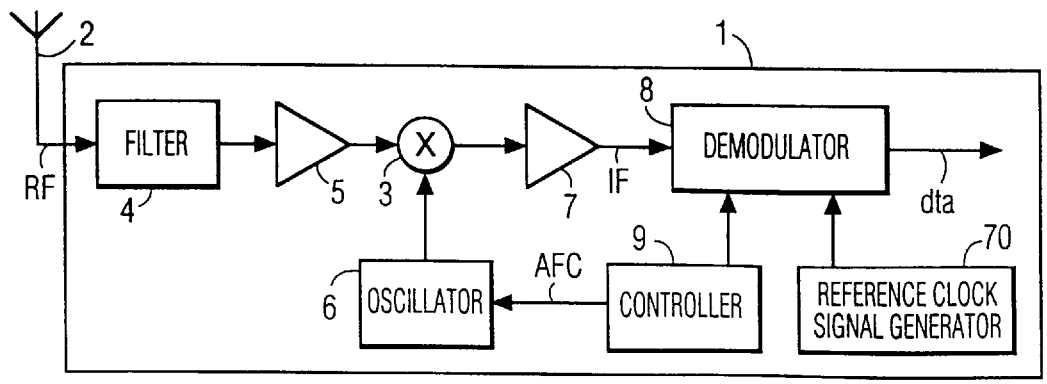
FIG. 1 shows a block diagram of a receiver according to the present invention.

FIG. 1 shows a block diagram of a receiver 1 according to the present invention. Such a receiver can be a paging receiver, a cordless telephony receiver, a cellular telephony receiver, or any other suitable radio receiver. The receiver 1 comprises an antenna 2 for receiving a radio frequency signal RF that is fed to a mixer 3 via a filter 4 and an RF-amplifier 5. A local oscillator 6 is coupled to the mixer 3 that provides an intermediate frequency modulated frequency shift keyed signal IF via an IF-amplifier 7 coupled thereto. The intermediate frequency signal IF is fed to a demodulator 8 that provides demodulated data dta. The receiver further comprises control means 9 that can be a suitably programmed microcontroller and/or a mixed software/hardware controller. The control means 9 can provide an automatic frequency control signal AFC to the local oscillator 6.

Figure 2:
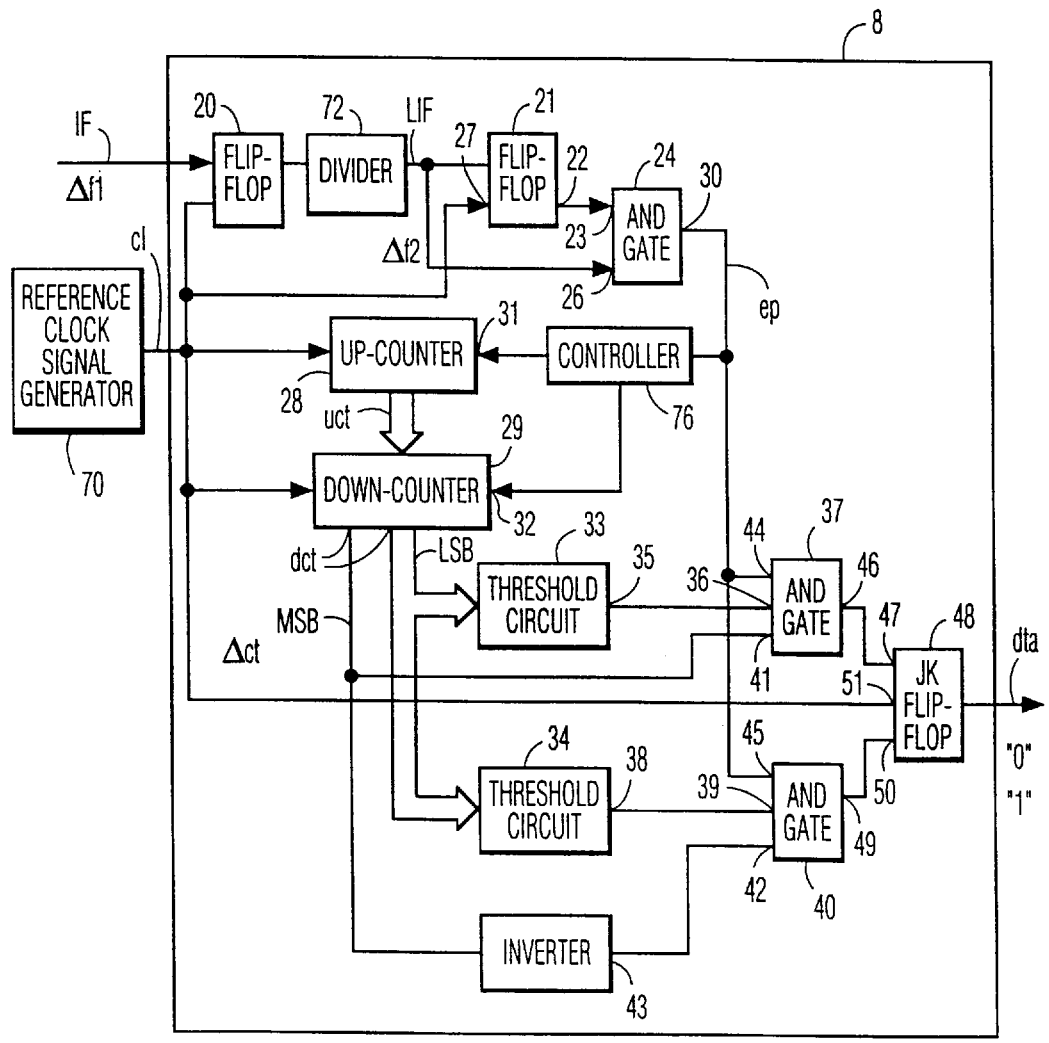
FIG. 2 shows a demodulator for use in a receiver according to the present invention.

FIG. 2 shows a first embodiment of the demodulator 8 for use in the receiver 1 according to the present invention. The demodulator 8 is arranged to transform the intermediate frequency modulated frequency shift keyed signal IF into a lower frequency modulated frequency shift keyed signal LIF. To this end, the demodulator 8 comprises a data flip-flop 20, to a data input of which the signal IF is fed and to a clock input of which a clock signal cl, from a reference clock signal generator 70, is fed. The intermediate frequency modulated frequency shift keyed signal IF has a first frequency deviation $\Delta f1$ and the lower frequency modulated frequency shift keyed signal LIF has a second frequency deviation $\Delta f2$. Before further detection, the signal LIF may be divided by means of a divider 72 dividing the lower frequency modulated frequency shift keyed signal by an integer divisor greater than one. The demodulator 8 further comprises a data flip-flop 21 of which an inverted output 22 is coupled to an input 23 of an and-gate 24. An output 25 of the data flip-flop 20 is coupled to an input 26 of the and-gate 24. The clock signal cl is also fed to a clock input of the data flip-flop 21. The data flip-flop 21 and the and-gate 24 form an edge detector for detecting positive going edges in the lower frequency modulated frequency shift keyed signal LIF. The demodulator 8 further comprises an up-counter 28 and a down-counter 29, both clocked by the clock signal cl. In operation, edge detector pulses ep appear at an output 30 of the and-gate 24, which are fed to a controller 76 which is coupled to a reset input 31 of the up-counter 28 and to a load input 32 of the down-counter 29. The edge detector pulses ep cause the up-counter to start counting up from zero each time a positive going edge is detected while at the same time a counter value uct is loaded into the down-counter 29. Timing control is controlled by controller 76. The demodulator 8 further comprises decision circuitry for determining the demodulated data dta from a counter value dct of the down-counter 29 at decision instants determined by the edge detector pulses ep. To this end, the up-counter value uct that is loaded into the down-counter 29 at an edge detector pulse ep is down-counted in the subsequent period until the down-counter value dct is obtained at the next edge detector pulse. Then, in principle, the decision circuitry determines whether the down-counter value is positive or negative. The decision as to the lower frequency modulated frequency shift keyed signal LIF is thus determining a difference in width $\Delta ct$ of two successively measured periods of the lower frequency modulated frequency shift keyed signal LIF. In other embodiments measuring of periods may be done over more than one period of the signal LIF. Preferably taking into account digital noise effects, the decision circuitry generates a first logic signal value "0" if the difference in width $\Delta ct$ has a first polarity, and a second logic signal "1" if the difference in width $\Delta ct$ has a second polarity. The decision circuitry comprises at least a data flip-flop (not shown in detail) clocked by the edge detector pulses ep and fed by a most significant bit MSB of the down-counter 29. To avoid undesired digital noise effects, however, the decision circuitry is more elaborated. In the embodiment given, the decision circuitry comprising a threshold circuit 33 for negative values of the difference in width $\Delta ct$ and a threshold circuit 34 for positive values of the difference in width $\Delta ct$. In an embodiment, the threshold circuits 33 and 34 can be OR-gates or a more elaborate decoder so as to decode at least one of the least significant bits of the down-counter 29. When the down-counter 29 has values 1, 2, or 3, or −1, −2, or −3, for instance, the data signal dta is prevented to change state. At least one of least significant bits LSB of the down-counter value dct is fed to the threshold circuits 33 and 34 so as to prevent the demodulator output data dta to change state if the difference in width $\Delta ct$ is below a given threshold value. An output 35 of the threshold circuit 33 is coupled to an input 36 of an and-gate 37, and an output 38 of the threshold circuit 34 is coupled to an input 39 of an and-gate 40. The most significant bit MSB is fed to an input 41 of the and-gate 37 and to an input 42 of the and-gate 40 via an inverter 43. The edge detector pulses ep are fed to respective inputs 44 and 45 of the and-gates 37 and 40. An output 46 of the and-gate 37 is coupled to a J-input 47 of a JK-flip-flop 48 and an output 49 of the and-gate 40 is fed to a K-input 50 of the JK-flip-flop 48. The clock signal cl is fed to a clock input 51 of the JK-flip-flop 48.

Figure 3:
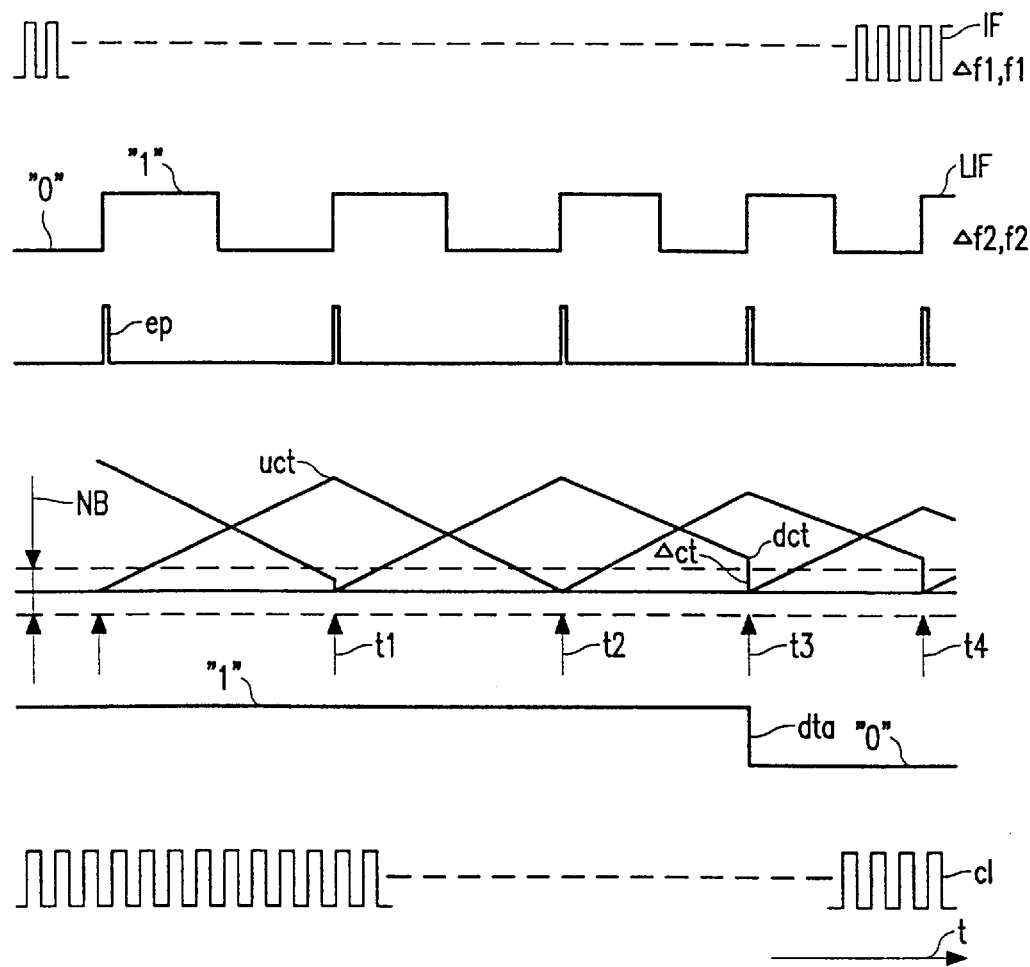
FIG. 3 shows a first timing diagram of a demodulator according to the present invention.

FIG. 3 shows a first timing diagram of the demodulator 8 according to the present invention to further illustrate the operation of the demodulator 8. The data flip-flop 20 transforms the intermediate frequency modulated signal IF having a frequency f1 into the lower frequency modulated signal LF having a frequency f2 according to f2=f1 mod fcl, fcl being the frequency of the clock signal cl, and mod being a mod operation. For instance in a pager according to the POCSAG Standard, a typical nominal intermediate frequency is 455 kHz, the frequency deviation $\Delta f1$ being +4.5 kHz for a logic signal "0" and being −4.5 kHz for a logic signal "1" of modulated data stream modulated by means of 2-FSK. For a frequency drift of the local oscillator at receiver side of more than 4.5 kHz, when referring to a fixed frequency, the data to be detected would not be distinguishable. According to the invention, the signal IF is transformed into the lower frequency signal LIF such that the absolute deviation is not changed. In a typical embodiment, the clock frequency fcl=435 kHz or 217.5 kHz or . . . , resulting in a nominal frequency f2 of 20 kHz, the second frequency deviation Δf2 still being= +4.5 kHz and −4.5 kHz, the same as the frequency deviation Δf1. Herewith, the relative deviation is increased from 1% to 22.5% and the accuracy of the clock frequency fcl may be 1% or 2% whereas a good detection is still possible. Thus, a cheap crystal oscillator may be used. In FIG. 3, decision instants t1, t2, t3, and t4 are shown when the down-counter 29 has down-counted the loaded up-counter signal uct to a down-counted signal dct. The data dta can change state only if the difference in width Δct exceeds the digital noise band NB, either in a positive or a negative sense.

Figure 4:
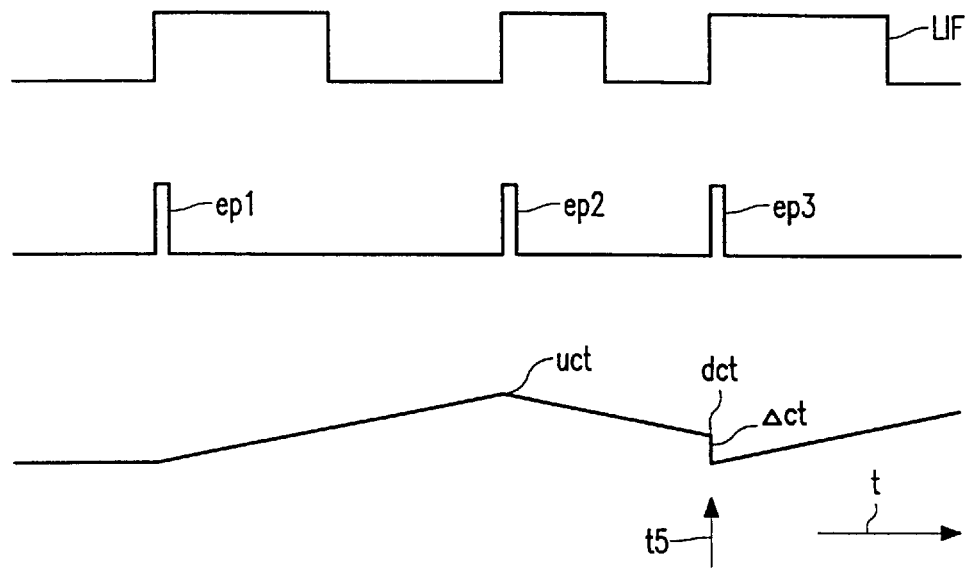
FIG. 4 shows a second timing diagram of a demodulator according to the present invention.
Figure 6:
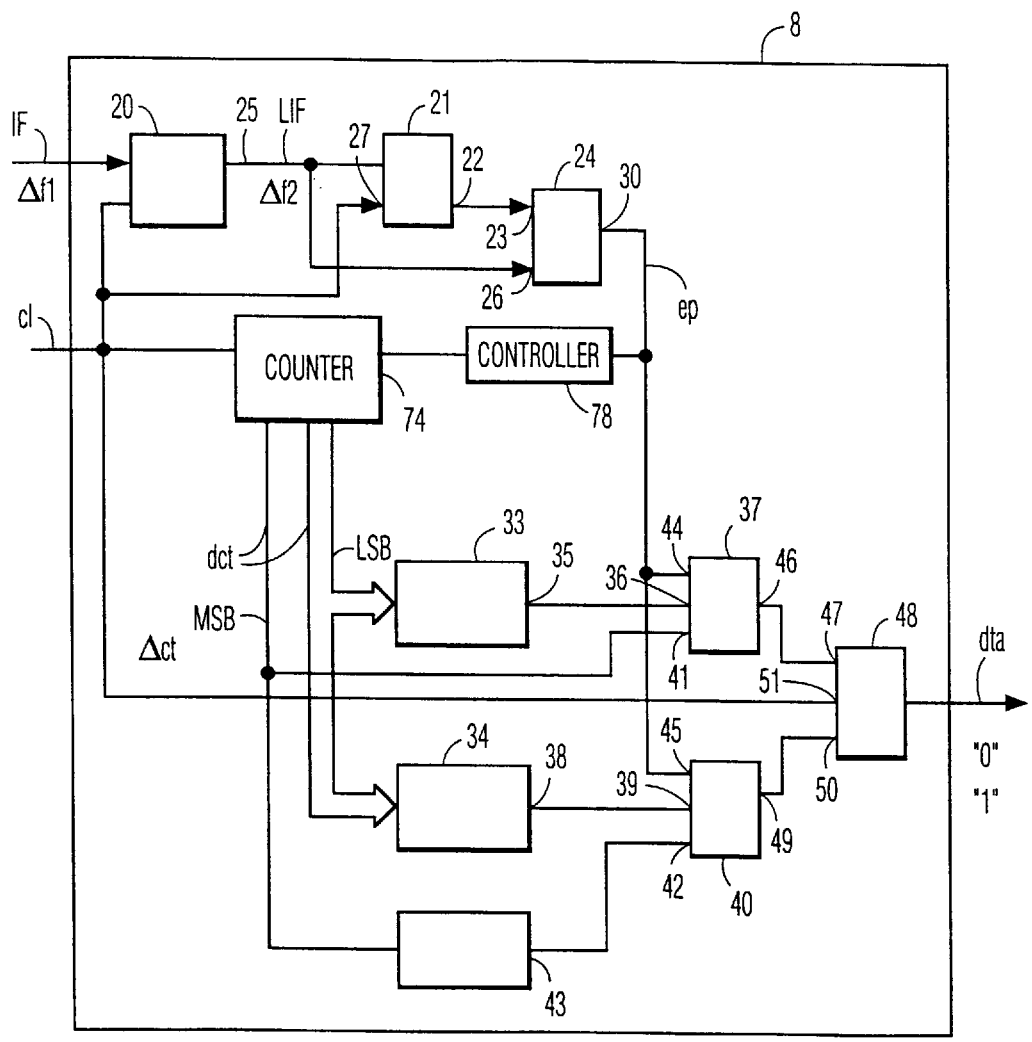
FIG. 6 shows an alternative embodiment of a demodulator according to the present invention.

FIG. 4 shows a second timing diagram of a second embodiment of the demodulator 8 according to the present invention, this second embodiment being depicted in FIG.6, with like reference numeral being used to represent like elements. Instead of having a separate up-counter 28 and a separate down-counter 29, a single up-down-counter 74, is used. In this embodiment, the decision circuitry is arranged to take a decision only after two edge detection pulses, or a multiple thereof, the up-down-counter being reset by a controller 78 upon detection of the edge detection pulse ep1 so as to start up-counting, the mode of the up-down-counter being reversed from up-counting to down-counting at a succeeding edge detection pulse ep2, and a decision instant being t5 at a still succeeding edge detection pulse ep3. Controller 78 changes the count mode of up-down counter 74 from either up-counting to down-counting, or down-counting to up-counting, at period boundaries.

Figure 5:
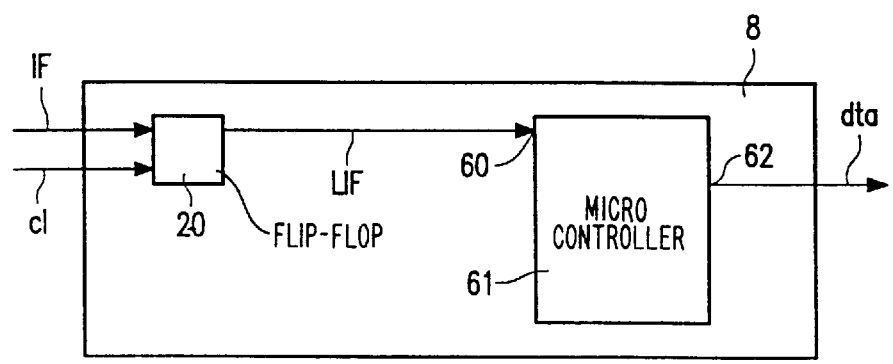
FIG. 5 shows an alternative embodiment of a demodulator according to the present invention.

FIG. 5 shows an alternative embodiment of a demodulator according to the present invention. The signal LIF is fed to an interrupt-sensitive input-port 60 of a microcontroller 61, and the data dta appear at an output-port 62 of the microcontroller 61. The microcontroller 61 is suitably programmed so as to implement the present invention. At positive going edges, an interrupt is generated so as to start time measurements of subsequent periods of the signal LIF in terms of the clock signal cl. The microcontroller 61 is programmed so as to calculate the difference in width Δct and to change state of the data signal dta at the output-port 62 according to the present invention, if the difference in width Δct exceeds the digital noise band NB. The microcontroller 61 can easily be programmed so as to adapt the number of periods for carrying out the time measurements before taking a decision as to the output data dta. Thus a demodulator has been described allowing reliable demodulation for relatively large frequency drifts.

I claim:

1. A receiver comprising a demodulator for demodulating an intermediate frequency modulated frequency shift keyed signal into demodulated data, the frequency shift keyed signal having a frequency deviation representing the data, wherein the demodulator is arranged to transform the intermediate frequency modulated frequency shift keyed signal into a lower frequency modulated frequency shift keyed signal so that the relative frequency deviation representing the data becomes substantially larger, and in that the demodulator is arranged to determine the demodulated data from the lower frequency modulated frequency shift keyed signal by determining a difference in width of at least two successively measured periods of the lower frequency modulated frequency shift keyed signal and by generating a first logic signal value if the difference has a first polarity and by generating a second logic signal value if the difference has a second polarity.

2. A receiver according to claim 1, wherein the demodulator comprises threshold means for preventing the logic signal value to change if the difference in width is below a predetermined threshold.

3. A receiver according to claim 1, including an up-counter for measuring and representing a width of at least one period and a down-counter for measuring and representing a width of at least one subsequent period; and control means for loading the down-counter with an up-counter counting value and resetting the up-counter at a period boundary.

4. A receiver according to claim 1, and including an up-down-counter for measuring and representing the width of the at least one period and the at least one subsequent period, and control means for changing a count mode of the up-down-counter from up-counting to down-counting at a period boundary, and vice versa.

5. A receiver according to claim 1, including a divider for dividing the lower frequency modulated frequency shift keyed signal by an integer divisor greater than one and that the demodulated data is determined from the divided lower frequency modulated frequency shift keyed signal.

6. A receiver according to claim 1, including a reference clock signal generator for generating a reference clock signal and a data flip-flop, the reference clock signal being coupled to a clock input of the data flip-flop, the intermediate frequency modulated frequency shift keyed signal being coupled to a data input of the data flip-flop, and the lower frequency modulated frequency shift keyed signal being available at an output of the data flip-flop.

7. A receiver according to claim 6, wherein the demodulator comprises an edge detector for detecting edges in the lower frequency modulated frequency shift keyed signal at signal period boundaries, and for generating control pulses while detecting the edges, the control pulses controlling measurement of the periods of the lower frequency modulated frequency shift keyed signal.

8. A demodulator for demodulating an intermediate frequency modulated frequency shift keyed signal into demodulated data, the frequency shift keyed signal having a frequency deviation representing the data, characterized in that the demodulator is arranged to transform the intermediate frequency modulated frequency shift keyed signal into a lower frequency modulated frequency shift keyed signal so that the relative frequency deviation representing the data becomes substantially larger, and in that the demodulator is arranged to determine the demodulated data from the lower frequency modulated frequency shift keyed signal by determining a difference in width of at least two successively measured periods of the lower frequency modulated frequency shift keyed signal and by generating a first logic signal value if the difference has a first polarity and by generating a second logic signal value if the difference has a second polarity.

9. A demodulation method for demodulating an intermediate frequency modulated frequency shift keyed signal into demodulated data, the frequency shift keyed signal having a frequency deviation representing the data, characterized in that the intermediate frequency modulated frequency shift keyed signal is transformed into a lower frequency modulated frequency shift keyed signal so that the relative frequency deviation representing the data becomes substantially larger, and in that the demodulated data is determined from the lower frequency modulated frequency shift keyed signal by determining a difference in width of at least two successively measured periods of the lower frequency modulated frequency shift keyed signal and by generating a first logic signal value if the difference has a first polarity and by generating a second logic signal value if the difference has a second polarity.

10. A receiver, said receiver comprising:

means for transforming an intermediate frequency modulated frequency shift keyed signal having a first frequency into a frequency modulated shift keyed signal having a frequency lower than said first frequency and for demodulating said intermediate frequency modulated frequency shift keyed signal into demodulated data, said intermediate frequency modulated frequency shift keyed signal having a frequency deviation representing said data;

means for determining a difference in width of at least two successively measured periods of the frequency modulated frequency shift keyed signal;

decision circuitry for generating a first logic signal value if the difference in width has a first polarity and generating a second logic signal value if the difference in width has a second polarity; and means for outputting said demodulated data in one of a first logic state and a second logic state, and wherein said logic state of said data changes from one of said first or said second logic state to the other of said first and second logic state when said logic signal value changes from one of said first logic signal value and second logic signal value to the other of said first and second logic signal values.

\* \* \* \* \*